United States Patent Office 3,446,621
Patented May 27, 1969

3,446,621

POSITIVE IMAGING PHOTOGRAPHIC PROCESS

Ernst-August Hackmann, Johannes Munder, and Roland Moraw, Wiesbaden-Biebrich, Germany, assignors to Kalle Aktiengesellschaft, Wiesbaden-Biebrich, Germany, a corporation of Germany No Drawing. Filed June 2, 1966, Ser. No. 554,697
Claims priority, application Germany, June 4, 1965, K 56,310
Int. Cl. G03c *1/64*
U.S. Cl. 96—49 5 Claims

ABSTRACT OF THE DISCLOSURE

Light-sensitive compositions comprising a ferrocene and a halogenated hydrocarbon are exposed and contacted with a noble metal salt solution which forms a noble metal positive image in the non-exposed areas.

The present invention relates to a process for the preparation of positive images, preferably of positive silver images of an original, and a light-sensitive material for the performance of the process.

It is known to prepare silver images by imagewise exposing a coating which is on a support and which contains a light-sensitive silver salt, and developing the formed silver nuclei by using a reducing developer bath and then removing the unconsumed silver salt, in most cases silver halide, from the light-sensitive coating in a fixing bath. This known process is disadvantageous, above all because the unconsumed silver salt of the light-sensitive coating is dissolved by the fixing bath and has to be recovered therefrom only in a relatively complicated manner.

Further, it is known that ferrocene and halogenated hydrocarbons react photochemically with one another under the action of actinic radiation there being formed, inter alia, ferricinium tetrahalogen ferrates (Körner von Gustorf,, H. Köller, M.J. Jun and G. O. Schenck, Chemie-Ingenieur, Technik, 35, 591 (1963)).

It is also known that ferrocene is readily oxidised by oxidising agents, such as 3 N nitric acid, iron (III) ions and silver ions, to form deep blue, water-soluble ferricinium cations.

It is an object of the present invention to provide a photosensitive copy material and a process which can be performed simply and rapidly without the occurrence of the disadvantages associated with conventional silver photography.

The basic of the process according to the invention consists in that a light-sensitive material, the light-sensitive coating of which contains one or more reducing substances which, when exposed to light, react with a second component which is likewise present in the light-sensitive coating, a non-reducing, water-soluble reaction product being formed, is imagewise exposed and the exposed material then brought into contact with the aqueous solution of a salt of a noble metal, preferably a silver salt, noble metal being deposited, by reduction, in the areas not affected by light and the light-reaction product being removed in the areas which were exposed to light, so that a positive image of the original is formed.

A further object of the invention is a process for the preparation of positive images, characterized in that a light-sensitive material, the light-sensitive coating of which contains ferrocene and a halogenated hydrocarbon which splits off halogen when exposed to light, is imagewise exposed and then brought into contact with the aqueous solution of a salt of a noble metal, preferably a silver salt, washed and dried.

During the imagewise exposure, the ferrocene in the areas affected by light reacts with the halogenated hydrocarbon to form a blue, water-soluble reaction product which does not have a reducing action, while in the areas which were not affected by light no reaction occurs, so that an aqueous solution of a silver salt is reduced by these areas with the deposit of metallic silver. Instead of aqueous silver salt solutions, aqueous solutions of gold or platinum salts may also be used. The noble metal formed during reduction adheres well to the surface of the material according to the invention, so that a high-contrast, fast-to-wiping image of the original is formed.

By the process according to the invention, it is achieved that very much less silver suffices than in the conventional photographic processes on the basis of silver halide, and that the working up of fixing baths containing silver is unnecessary. Positive and grain-free images are obtained directly. Compared with diazotype materials, the new copying material has the advantage of the high light stability of the silver image, high covering power when used as intermediate original and absolute fastness to water. Since a blue light-decomposition product is formed in the areas affected by light, an image of the original can be seen immediately after exposure which is advantageous for checking or correction of the copy.

Moreover, the process according to the invention can be performed substantially more rapily than the hitherto known photographic process on the basis of silver halide, since, after exposure has been effected, there is already obtained, after a developing time of about 1 minute, the finished image, which has only to be washed briefly, and dried. A process step corresponding to the fixation necessary in conventional silver photography is not necessary in the process according to the invention.

The application of the aqueous developer solution to the exposed material can be effected by immersion, spraying, or application with rollers which may, if desired, be covered with fabric, for example felt.

In order to ensure a rapid development of the image, the developer solution's content of noble metal salt should preferably be 25–35%. When these solutions are used, development takes about 1 minute. However, more dilute solutions may also be used for development, in which case, of course, longer developing times have to be accepted.

When greatly diluted developing solutions are used, the process according to the invention may be varied in that, by brief action of the dilute developer solution on the imagewise exposed material, silver nuclei are first produced on the surface of the said material and these silver nuclei developed physically, for example according to the method stated in German Patent No. 1,106,601.

A further object of the invention is a light-sensitive material comprising a support and a light-sensitive coating, for the performance of the process according to the invention. The material according to the invention is characterized in that the light-sensitive coating contains ferrocene and a halogen hydrocarbon which splits off halogenated when exposed to light.

As halogen compounds to be used according to the invention, which split off halogen when exposed to lgiht, compounds of the general formula

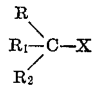

are eligible, wherein:

X may stand for chlorine, bromine or iodine and R, $R_1$ and $R_2$ may be the same or different and may stand for chlorine, bromine, iodine, hydrogen and alkyl or isoalkyl (which may, if desired, be substituted by chlorine, bromine or iodine), aryl, aralkyl, alkenyl or a heterocyclic group.

Particularly good results are achieved with tetrabromomethane, 3-nitro-w,w,w-tribromoacetophenone, pentabromoethane and iodoform. To prepare the copying material according to the invention, a solution of ferrocene and one or more halogen compounds of the above-mentioned formula are applied to a support, and the solvent is evaporated. As support material, wood, glass, plastics film, metal foil, textiles and, in particular, cellulose derivatives, such as e.g. cellulose triacetate and paper, are eligible.

For better adhesion to a support material with a smooth surface, aqueous dispersions, e.g. casein, starch, gelatin, carboxymethylcellulose, polyvinyl acetate, preferably with the addition of pigments, such as $SiO_2$, $TiO_2$, $BaSO_4$ and the like, may be precoated.

Besides ferrocene, other metallocenes may also be used, e.g. nickelocene and cobaltocene. These, however, because of their hydrolysis sensitivity, are, for the preparation of a copying material, preferably to be used embedded in resin layers.

The invention is illustrated by the following examples:

EXAMPLE 1

A light-sensitve material, which had been prepared by coating baryta paper on one side with a solution of 0.1 g. of ferrocene and 1.5 g. of tetrabromomethane in 10 ml. of trichloroethylene and evaporation of the solvent, was exposed through an original for 30 seconds with a carbon arc lamp. The exposed material was then immersed for 2 minutes in an aqueous 30% solution of silver nitrate, metallic silver being deposited in the areas which had not been exposed to light, and the blue decompostion product of the ferrocene formed in the exposed areas being dissolved. The copy was then washed in running water for 2 minutes, and dried. A positive, black and white copy of the original was obtained.

Equally good results were obtained when a light-sensitive material was used, the light-sensitive coating of which contained, instead of tetrabromomethane, 3-nitro-w,w,w-tribromoacetophenone and/or pentabromoethane.

EXAMPLE 2

A light-sensitive material, which had been prepared by coating transparent paper with a solution of 0.1 g. of ferrocene and 1.5 g. of tetrabromomethane in 10 ml. of trichloroethylene, was exposed and developed as described in Example 1. A positive, transparent copy of the original was obtained which can serve as intermediate original.

When superficially saponified acetate foil is used instead of transparent paper, in this case too a transparent copy of the original was obtained which could be used as intermediate original.

EXAMPLE 3

A base paper of the kind commonly used in photocopying processes was precoated with starch and then coated with a solution of 0.1 g. of ferrocene and 1.5 g. of tetrabromomethane in 10 ml. of acetone, and dried. The thus prepared material was exposed through an original for 30 seconds with a commercial 500-watt mixed light lamp, the distance between the lamp and the paper being 25 cm. The exposed material was developed for 2 minutes in a 30% aqueous solution of silver nitrate, washed for 2 minutes in running water, and dried. A positive, black copy on a colourless background was obtained.

When a base paper precoated with casein and a 200-watt incandescent lamp were used, with an exposure time of 45 seconds and the same method of working equally good results were obtained.

EXAMPLE 4

A photographic base paper (90 g./m.$^2$) was coated with a solution of 0.5 g. of tetrabromomethane and 0.05 g. of ferrocene in 10 ml. of trichloroethylene and dried. The material was then exposed under an original to a commercial 500-watt mixed light lamp. After exposure, images of silver nuclei were formed by treating the paper with an aqueous solution containing 0.01 mol of silver nitrate and 0.2 mol of an acetic acid/sodium acetate buffer mixture (pH=6) per liter. The treatment lasted about 10 seconds. After a further 10 seconds, the paper was physically developed, by moving it for 40 seconds in an aqueous solution containing 0.2 mol of ferro-ammonium-sulfate, 0.2 mol of ferric nitrate, 0.14 mol of citric acid, 0.2 mol of silver nitrate, and 0.02 percent by weight of "Armac 12D" (a product of Armour & Co., U.S.A.) per liter. After this treatment, a positive black silver image of the original had formed on the paper which adhered very strongly to the paper. The copy was washed with water and dried.

Equally good results were obtained if the tetrabromomethane used above was replaced by pentabromoethane or 3-nitrotribromoacetophenone.

EXAMPLE 5

A highly beaten transparent paper (35 g./m.$^2$) was coated with a solution of 1 g. of tetrabromomethane and 0.05 g. of ferrocene in 10 ml. of trichloroethylene, exposed for 30 seconds under an original to a carbon arc lamp, and then further treated as described in Example 4. The copy thus obtained was excellently suitable as intermediate original in a photographic printing process.

The above examples have been presented for the purpose of illustration and should not be taken to limit the scope of the present invention. It will be apparent that the described examples are capable of many variations and modifications which are likewise to be included within the scope of the present invention as set forth in the appended claims.

What is claimed is:

1. A photocopy method comprising:

(a) imagewise exposing a photosensitive composition comprising a ferrocene and a halogenated hydrocarbon which splits off halogen when exposed to light to actinic radiation;

(b) contacting the exposed composition with an aqueous solution of a noble metal salt, whereby a noble metal image is formed corresponding to the non-exposed portions of said materials.

2. The photocopy method according to claim 1, wherein said noble metal salt solution is an aqueous solution of from about 1% to 40% of a silver salt.

3. The photocopy method according to claim 1, further comprising the step of intensifying said noble metal image by contacting said image with an aqueous photographic physical developer solution.

4. The photocopy method according to claim 3, wherein said physical developer solution comprises about 0.2 mol ferro-ammonium-sulfate, 0.2 mol ferric nitrate, 0.14 mol citric acid, and 0.2 mol silver nitrate.

5. The photocopy method according to claim 1, further comprising the step of washing said material with water to remove water-soluble light-exposed portions of said composition.

References Cited

UNITED STATES PATENTS

| | | | |
|---|---|---|---|
| 3,321,501 | 5/1967 | Wilkus et al. | 96—92 |
| 3,335,008 | 8/1967 | Dubosc | 96—92 |

FOREIGN PATENTS

| | | |
|---|---|---|
| 637,398 | 3/1964 | Belgium. |
| 1,466,079 | 1/1966 | France. |

J. TRAVIS BROWN, *Primary Examiner.*

CAROLYNE E. DAVIS, *Assistant Examiner.*

U.S. Cl. X.R.

96—48